(12) United States Patent
van Merkstoijn

(10) Patent No.: US 8,323,775 B2
(45) Date of Patent: Dec. 4, 2012

(54) TURBULENCE FOIL

(75) Inventor: Jacobus Lambertus van Merkstoijn, Zurich (CH)

(73) Assignee: Kick Off Ltd., Anguilla (IO)

( * ) Notice: Subject to any disclaimer, the term of this patent is extended or adjusted under 35 U.S.C. 154(b) by 609 days.

(21) Appl. No.: 12/063,571

(22) PCT Filed: Aug. 8, 2006

(86) PCT No.: PCT/EP2006/007950
§ 371 (c)(1),
(2), (4) Date: Feb. 28, 2008

(87) PCT Pub. No.: WO2007/017290
PCT Pub. Date: Feb. 15, 2007

(65) Prior Publication Data
US 2010/0159204 A1    Jun. 24, 2010

(30) Foreign Application Priority Data
Aug. 10, 2005   (NL) .................................. 1029708

(51) Int. Cl.
*B32B 3/30*   (2006.01)
*B64C 1/38*   (2006.01)
*B63B 1/34*   (2006.01)

(52) U.S. Cl. ........ 428/167; 428/172; 244/130; 244/200; 114/67 R; 114/290

(58) Field of Classification Search .................. 428/167, 428/172, 188; 244/130, 199.1, 204, 200; 114/67 R, 272, 288, 290
See application file for complete search history.

(56) References Cited

U.S. PATENT DOCUMENTS

| | | | |
|---|---|---|---|
| 83,938 A | 11/1868 | Drake et al. | |
| 3,741,285 A | 6/1973 | Kuethe | |
| 4,650,138 A | 3/1987 | Grose | |
| 4,750,693 A * | 6/1988 | Lobert et al. | 244/200 |
| 4,907,765 A * | 3/1990 | Hirschel et al. | 244/200 |
| 5,114,099 A | 5/1992 | Gao et al. | |
| 5,756,217 A * | 5/1998 | Schroder et al. | 428/469 |
| 5,848,769 A * | 12/1998 | Fronek et al. | 244/200 |
| 6,092,766 A | 7/2000 | Laroche et al. | |
| 6,345,791 B1 | 2/2002 | McClure | |
| 6,412,853 B1 | 7/2002 | Richardson | |
| 6,415,835 B1 * | 7/2002 | Heinen | 152/209.21 |
| 6,468,629 B1 * | 10/2002 | Lodder | 428/158 |

FOREIGN PATENT DOCUMENTS

| | | |
|---|---|---|
| GB | 357 637 A | 9/1931 |
| JP | 2001 050215 A | 2/2001 |
| WO | WO 80/01673 A | 8/1980 |

* cited by examiner

*Primary Examiner* — Donald J Loney
(74) *Attorney, Agent, or Firm* — Dwayne E. Rogge; Schacht Law Office, Inc.

(57) ABSTRACT

The disclosure relates to a layer (1) for reducing air resistance of a forward-moving object, which layer comprises a pattern of surfaces (2) rising in a first direction R, and—channels (3) running between the surfaces in a second direction at an angle to the first direction. A flow is brought about on a micro-scale in the channels which damps the occurrence of turbulence in the main flow over the surface, thereby reducing air resistance.

18 Claims, 2 Drawing Sheets

TURBULENCE FOIL

SUMMARY OF THE DISCLOSURE

The object of this disclosure relates to a layer for reducing air resistance of a forward-moving object. In forward-moving objects such as, for instance, a vehicle it is desirable to minimize the air friction, since optimum performance can hereby be obtained in respect of the forward movement of the vehicle. The performance of the moving object, such as a vehicle, is influenced to a great extent by the air resistance. The air resistance depends on the speed and the surface over which flow takes place.

In addition, the so-called CW value is important in the air resistance. The CW value is a characteristic value that is related to the design of the object and how the air flows along this object.

The state in which the air flows along the object is also important for the air resistance. If the air flows along the object in a laminar state, the resistance will be less than if the air flows turbulently along the object. The case occurs in any forward-moving object, wherein the arriving airflow is laminar and somewhere on the surface of the object is transformed into a turbulent airflow. The further to the rear the transition point from laminar to turbulent lies, the lower the air resistance will be.

It is now an object of the disclosure to provide a layer which can be arranged on a forward-moving object and with which the air resistance can be reduced.

This object is achieved with a layer which comprises a pattern of surfaces rising in a first direction, and channels running between the surfaces in a second direction at an angle to the first direction.

The rising surfaces in one form ensure that the air is guided as far as the end of the rising surface and, at the transition to the following rising surface, enters a channel where the air becomes turbulent on a micro-scale. Owing to the rising surfaces a laminar flow is then created on a micro-scale in the channels. This laminar flow ensures that the possible beginning of turbulence in the main flow over the object is damped, whereby the transition point between laminar flow and turbulent flow can be displaced further in flow direction. Due to the channels running at an angle these zones of turbulent flow are distributed uniformly over the surface, thereby creating a uniform damping effect.

In a preferred embodiment the first and second directions form an angle of between 30° and 60°, preferably 45°. In another embodiment each surface comprises at least one groove running in the first direction. During flow some of the air will run through this groove and, when running out into one of the channels between the surfaces, will ensure that the turbulent flow in these channels is blown away, whereby a flow of this turbulent air is generated which also contributes toward the damping effect, and thus displaces the transition point between laminar flow and turbulent flow in the main flow further to the rear as seen in the direction of the flow.

The width of at least one groove preferably lies in the range of 0.1-1 mm.

In another preferred embodiment of the layer according to the invention, the quotient of the pitch distance in the first direction between adjacent surfaces and the desired cruising speed of the object is substantially 20-65 kHz. Due to the alternating changes in height between the different rising surfaces vibrations occur in the air which can possibly cause a sound. The generation of these vibrations likewise causes air resistance, which is undesirable. By now modifying the distance between the surfaces to the desired cruising speed of the object it is possible to select the created vibrations such that a minimum amount of energy is lost herein. It has been found that this energy consumption is minimal at a frequency of around 20-65 kHz.

In yet another embodiment of the layer according to the disclosure, the layer is a foil. The foil preferably comprises a PVC base layer and a Teflon top layer. Through flow of the air along the Teflon top layer the particles in the air brushing along the top layer become electrostatic. The advantage is that this electrostatically charged air layer has a viscosity other than the air lying thereabove, thereby reducing the possible occurrence of friction.

These and other features of the invention are further elucidated with reference to the accompanying drawings.

DESCRIPTION OF THE PREFERRED EMBODIMENTS

Layer 1 has a number of separate surfaces 2 which rise in the direction R. Channels 3 are provided between surfaces 2.

Surfaces 2 are further provided with grooves 4.

Figure 1:
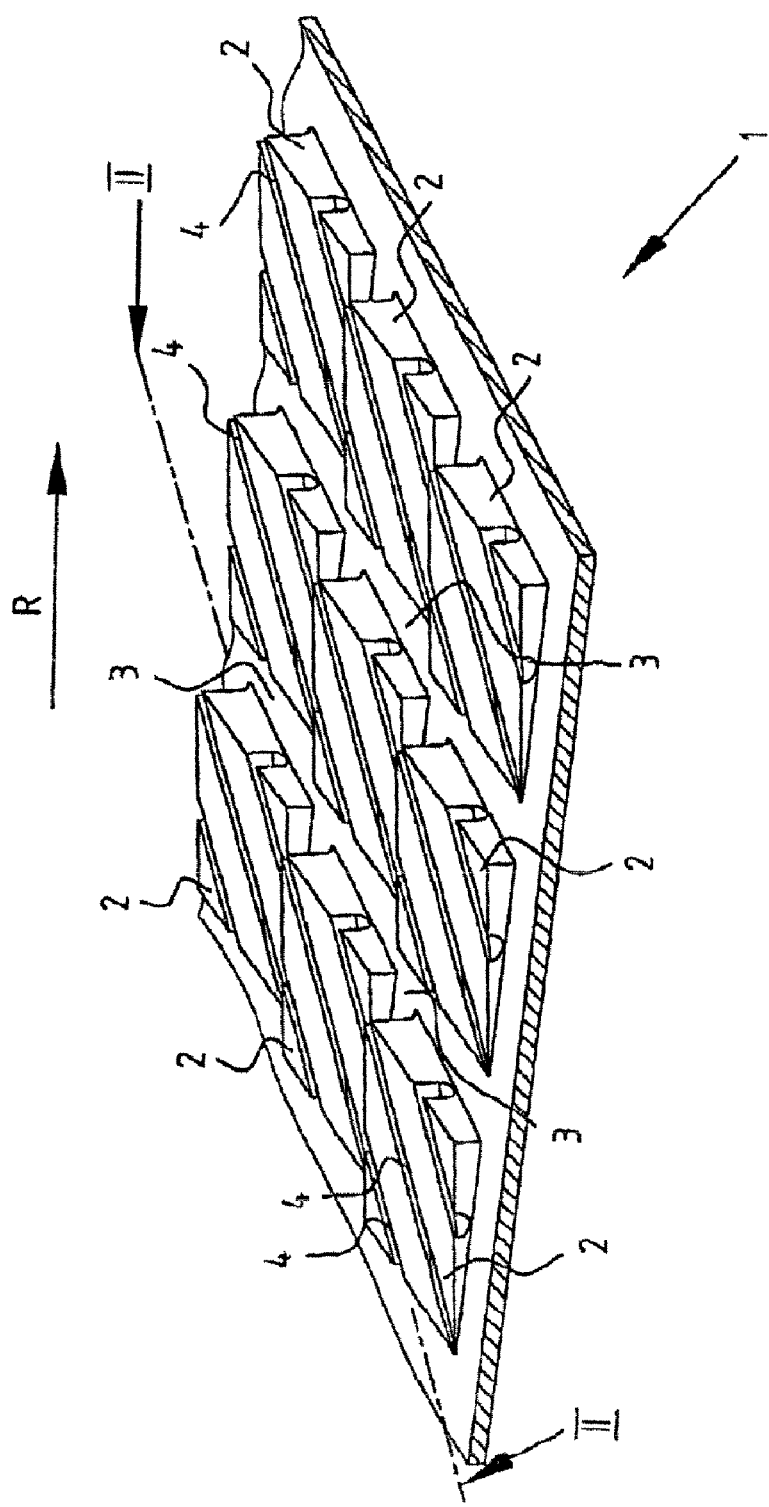
FIG. 1 shows a perspective view of an embodiment of a layer.
Figure 2:
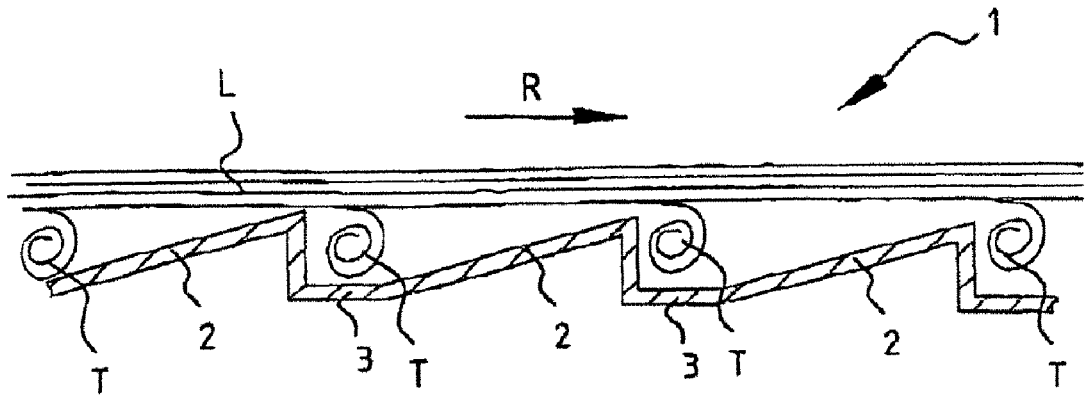
FIG. 2 shows a cross-sectional view of the layer according to FIG. 1.

FIG. 2 shows a cross-sectional view of layer 1 of FIG. 1. When an airflow L passes over layer 1 in direction R, swirling T will be created in channels 3 which provides a damping effect. The airflow L above this swirling T will thus be damped as soon as signs of turbulence occur. Air layer L thus remains laminar for a longer time, whereby the air resistance of an object on which this layer 1 is arranged is reduced.

Figure 3:
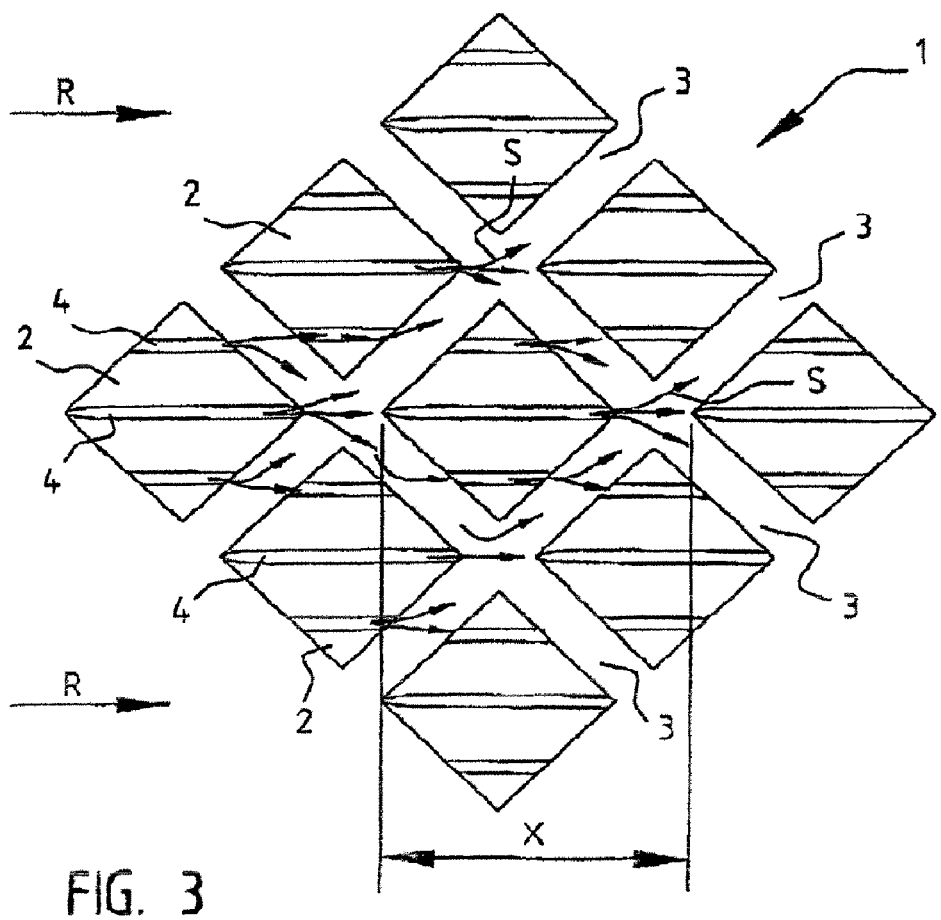
FIG. 3 shows a top view of the layer according to FIG. 1.

FIG. 3 shows the top view of layer 1 of FIG. 1. When air flows over layer 1 in direction R, swirling will occur in channels 3 as shown in FIG. 2. Through grooves 4 arranged in surfaces 2 occurs a flow S which distributes this turbulence over channels 3. The damping effect of the turbulent air in channels 3 will hereby damp the air flowing along layer 1 in uniform manner and thus delay the transition between laminar air and turbulent air, thereby creating a lower air resistance. The pitch distance X between two successive surfaces 2, as seen in direction R, is chosen such that the quotient of distance X and the desired cruising speed of the object on which this layer is arranged substantially equals 20-65 kHz. At such a value the energy loss from the generation of air vibrations is minimal.

When layer 1 according to the disclosure is arranged on a vehicle, for instance a car, the pitch distance of the surfaces and the orientation thereof can then be adapted to the airflow over the surface of the car. Various aspects can thus be further optimized in order to obtain the lowest possible air resistance. The power of the engine is hereby utilized better, and this power can be used either to obtain a lower fuel consumption or a higher top speed.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A layer for reducing air resistance of a foreword-moving object, which layer comprises:
   a) a base surface;
   b) a pattern of projections extending from the base surface;
   c) wherein the pattern of projections comprises projections adjacent to each other in a direction substantially aligned with the direction of flow, and separate projections substantially adjacent to each other in a direction orthogonal to the direction of flow;
   d) each projection having a top surface which is inclined in a first direction relative to the base surface;
   e) wherein the top surface of each projection lies upon a geometric plane;
   f) wherein the top surface of each projection reduces air resistance of the forward-moving object by increasing micro-scale turbulence as the air passes over the pattern of projections extending from the base surface;
   g) wherein each projection comprises at least one groove running in the first direction; and
   h) channels running between each projection in a second direction at an angle to the first direction.

2. The layer as recited in claim 1, wherein the first and second directions form an angle of between 30° and 60°, preferably 45°.

3. The layer as recited in claim 1, wherein the width of at least one groove lies in the range of 0.1-1 mm.

4. The layer as recited in claim 1, wherein the quotient of the pitch distance in the first direction between adjacent surfaces and the speed of the object is substantially 20-65 kHz.

5. The layer as recited in claim 1, wherein the layer is a foil.

6. The layer as recited in claim 5, wherein the foil has a PVC base layer and a polytetrafluoroethylen top layer.

7. The layer as claimed in claim 5, wherein the foil has a base layer and a top layer.

8. The layer as recited in claim 2, wherein the first and second directions form an angle of 45°.

9. The layer as recited in claim 1 wherein the layer is disposed upon the surface of a foil.

10. The layer as recited in claim 1, wherein each projection comprises:
    a) a top surface which is inclined in a first direction relative to the base surface from a first corner of the projection to a diagonally opposed second corner of the projection;
    b) wherein the diagonal direction is in a geometric plane parallel to the base surface; and
    c) wherein the first corner is substantially at the level of the base surface.

11. The layer as recited in claim 1, wherein the base surface substantially lies upon a geometric plane.

12. The layer as recited in claim 11, wherein each groove comprises a bottom which is substantially parallel to the base surface.

13. The layer as recited in claim 12, wherein each groove comprises a bottom which is substantially parallel to, and in contact with the base surface.

14. The layer as recited in claim 12, wherein each groove comprises a bottom which is in contact with the base surface.

15. The layer as recited in claim 1, wherein each projection comprises sidewalls on at least three sides of each projection wherein each sidewall substantially lies upon a geometric plane and wherein each sidewall is substantially orthogonal to the base surface.

16. The layer as recited in claim 1, wherein the first direction is parallel to the forward direction of the moving object.

17. The layer as recited in claim 1, wherein each channel comprises a bottom which substantially lies upon a geometric plane and wherein the bottom is substantially parallel to, and in contact with, the base surface.

18. The layer as recited in claim 1, comprising a plurality of substantially parallel grooves wherein adjacent grooves on the same projection are separated by a significant portion of the top surface of the projection.

* * * * *

UNITED STATES PATENT AND TRADEMARK OFFICE
CERTIFICATE OF CORRECTION

| | | |
|---|---|---|
| PATENT NO. | : 8,323,775 B2 | Page 1 of 1 |
| APPLICATION NO. | : 12/063571 | |
| DATED | : December 4, 2012 | |
| INVENTOR(S) | : Jacobus Lambertus Van Merksteijn | |

It is certified that error appears in the above-identified patent and that said Letters Patent is hereby corrected as shown below:

on the title page:   Item (12) "United States Patent
                       van Merkstoijn" should be

(12) United States Patent
                       Van Merksteijn on the title page:   Item (75) "Inventor: Jacobus Lambertus van Merkstoijn" should be

(75) Inventor: Jacobus Lambertus Van Merksteijn

Signed and Sealed this
Twenty-ninth Day of January, 2013

David J. Kappos
*Director of the United States Patent and Trademark Office*